US007958103B1

(12) United States Patent
Tang et al.

(10) Patent No.: US 7,958,103 B1
(45) Date of Patent: Jun. 7, 2011

(54) INCORPORATED WEB PAGE CONTENT

(75) Inventors: Gary Tang, Santa Clara, CA (US); Igor Shmulevich, San Ramon, CA (US); Peggy Ringhausen, Coppell, TX (US)

(73) Assignee: EMC Corporation, Hopkinton, MA (US)

( * ) Notice: Subject to any disclaimer, the term of this patent is extended or adjusted under 35 U.S.C. 154(b) by 98 days.

(21) Appl. No.: 11/731,404

(22) Filed: Mar. 30, 2007

(51) Int. Cl.
*G06F 17/30* (2006.01)
(52) U.S. Cl. ........ 707/706; 707/715; 707/716; 707/717; 707/721; 707/731; 704/7; 704/9
(58) Field of Classification Search ................. 707/1–7, 707/10, 706–710; 704/7–9
See application file for complete search history.

(56) References Cited

U.S. PATENT DOCUMENTS

| | | | | |
|---|---|---|---|---|
| 5,943,643 A * | 8/1999 | Van De Veen | .................... | 704/2 |
| 5,963,938 A * | 10/1999 | Wilson et al. | ........................ | 1/1 |
| 6,493,703 B1 * | 12/2002 | Knight et al. | ..................... | 707/3 |
| 6,959,326 B1 * | 10/2005 | Day et al. | ....................... | 709/217 |
| 7,027,975 B1 * | 4/2006 | Pazandak et al. | ................. | 704/9 |
| 7,287,227 B2 * | 10/2007 | Ries et al. | ..................... | 715/741 |
| 2004/0107423 A1 * | 6/2004 | Noda | ............................ | 719/311 |
| 2004/0249800 A1 * | 12/2004 | Lu | ..................... | 707/3 |
| 2005/0055347 A9 * | 3/2005 | Cho et al. | .......................... | 707/5 |
| 2005/0071217 A1 * | 3/2005 | Hoogs et al. | ..................... | 705/10 |
| 2005/0086046 A1 * | 4/2005 | Bennett | ............................. | 704/2 |
| 2005/0149510 A1 * | 7/2005 | Shafrir | ............... | 707/3 |
| 2005/0165743 A1 * | 7/2005 | Bharat et al. | ..................... | 707/3 |
| 2005/0203924 A1 * | 9/2005 | Rosenberg | .................... | 707/100 |
| 2006/0041562 A1 * | 2/2006 | Paczkowski et al. | ........... | 707/10 |
| 2006/0059166 A1 * | 3/2006 | Sieffert et al. | .................. | 707/10 |
| 2006/0106793 A1 * | 5/2006 | Liang | ................. | 707/5 |
| 2007/0100809 A1 * | 5/2007 | Dettinger et al. | ................ | 707/4 |
| 2007/0260671 A1 * | 11/2007 | Harinstein et al. | ............ | 709/203 |
| 2008/0154873 A1 * | 6/2008 | Redlich et al. | .................... | 707/5 |

* cited by examiner

*Primary Examiner* — Hanh B Thai
(74) *Attorney, Agent, or Firm* — Van Pelt, Yi & James LLP (57) ABSTRACT

Including search result based content in a webpage is disclosed. One or more search criteria and an indication that a search result based content associated with the search criteria is to be included in a web page are received. A computer script or code configured to enable the search result based content to be retrieved in accordance with the search criteria is generated automatically for the web page.

24 Claims, 9 Drawing Sheets

100

Recent Public Releases:

Search Results:

1. Company A releases product X

2. Company B releases product Y

3. Company C releases product Z

4. Company D releases product W

| | | 510 |
|---:|:---|:---:|
| *Search Criteria: | Search for "Product" in mangalore | Edit |
| *Link Label: | {$object_name} | Edit  515 |
| Tooltip: | Document {$object_name} published on {$r_modify_date} | Edit |
| | | 520 |
| Paragraph: | {$title} ({$authors}) | Edit |
| Bullet Image: | | Browse |
| Target: | Same Window ▼ | |
| Max Number of Links: | 10 | 525 |

FIG. 5A

| | |
|---:|:---|
| Object Type: | Document (dm_document) ▼ |
| 530 | |
| Properties: | Name ▼  contains ▼  Product |
| 535 | Add another property |
| Date: | Modified ▼ |
| 540 | ⦿ Anytime ▼ |
| | ○ From [Date] |
| | To [Date] |
| Size: | Any Size ▼ |
| 545 | |

FIG. 5B

550 — Effective : [Date 📅▼] , [Hour ▼] : [Minute ▼]
Keeping default settings means that the page will be published soon as it reaches the Approved state.

560 — Expiration :
- ⦿ Never Expire
- ○ Expire On

[Feb 9, 2007 📅▼] , [11 ▼] : [30 ▼]

Publish Formats : Edit
Locate : English (US)
Use Fallback Rules : ☑
Web Ready : Not Ready

Auto-refresh Options:

| Site Publishing Configuration | Required Refresh | Frequency | Start On |
|---|---|---|---|
| gary.com | ☐ | 1 Days ▼ | Date 📅▼ |

| Title | Link | Date | Language | Author |
|---|---|---|---|---|
| Page 1 | http://... | | | |
| Image 2 | http://... | | | |
| Video 3 | http://... | | | |

INCORPORATED WEB PAGE CONTENT

BACKGROUND OF THE INVENTION

With the proliferation of online information, web pages nowadays often include surveys or search results performed on other websites and databases. Based on pre-defined search criteria, these imbedded surveys and search results are automatically generated without any inputs from their readers. This kind of technique has been widely adopted by enterprise websites to list relevant information, such as press releases, product information, and internal documentation.

However, search results that are only generated once and then statically imbedded into a web page become obsolete very soon, especially in the ever changing enterprise world. For example, a marketing page showing public releases a year ago is probably not very helpful. On the other hand, it is inefficient and error-prone to have web designers update their search contents regularly and go through the whole approval process again.

Therefore, it is highly desirable to have a web page automatically update search results included as web page content, e.g. periodically. This is traditionally done using scripting languages such as JavaScript™, but the required programming expertise prevents average users or content providers from designing such pages. Moreover, modern enterprises often use content management systems and/or other repositories to manage content files and other objects. The repositories typically determine which documents have passed the approval process to be published to the outside world. In such a repository, customized scripts may be hard to write or even forbidden to run due to security concerns. Hence, a user friendly way is needed to include search result-based web page content.

BRIEF DESCRIPTION OF THE DRAWINGS

The present invention will be readily understood by the following detailed description in conjunction with the accompanying drawings, and in which.

DETAILED DESCRIPTION

The invention can be implemented in numerous ways, including as a process, a system, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Defining and updating search result-based web page content are disclosed. In various embodiments, upon publication of a web page and/or periodically thereafter, search result-based web page content is updated and included in the page as published. In some embodiments, only published search result based content is included in a published web page, and as-yet-unpublished content responsive to the search is not included. In some embodiments, only content from pages that satisfy the search criteria and match a life cycle state of the web page (e.g., work-in-progress, approved, published, etc.) is included in the search result based content. In some embodiments, content from pages associated with a primary or other language associated with the web page is included in the search result based content. In some embodiments, if multiple similar or corresponding pages are found in a search, a page that matches a primary language of the web page is used. In some embodiments, a page associated with a secondary or default language, e.g., English, is used if no similar or corresponding page matching the primary language of the web page is found. The search criteria and the schedule for updating the search results-based content are specified, which is done in various embodiments through a graphical user interface or by directly editing the source code of the web page. In some embodiments, the specified search criteria and the update schedule are imbedded into the webpage, which is saved in an intermediate format, e.g. XML, in a repository during development and/or approval of the web page. Sometimes, a display format can also be specified alongside the search criteria to dictate how search results are to be organized and displayed on the web page. Once specified, a search is performed in the repository immediately to display the results on the web page while it is still being developed, thus helping the designer to visualize the final product. In some embodiments, each of at least a subset of content objects in the repository have associated metadata, e.g., one or more attributes of the object, such as date created or last modified and/or accessed, language, and department. Search criteria can include constraints based on these attributes as well as key word searches, full text index searches, etc., depending on the configuration and/or capabilities of the repository. In some embodiments, a search can be performed across different repositories with different attributes through translation interfaces.

Once the web page development is finished, it typically goes through a review and approval process in the repository before being published, e.g. being translated into an HTML format file and put on a public web server. In some embodiments, every time the web page is published, a search is performed and only published pages that meet the search criteria are returned and/or included in the web page as published. The returned search results are statically imbedded into the generated HTML file for public access.

Even after the web page is published and put on a public web server, in some embodiments its original definition and/or content in the intermediate format, e.g. XML, is still managed by the repository. In some embodiments, any change made to the web page as it exists in the intermediate format in the repository will result in the web page being republished automatically, without further user action. If a schedule is stipulated, the web page will be forced to perform searches accordingly to update its search content before being republished. Any other page including this web page will be forced to republish as well.

Figure 1:
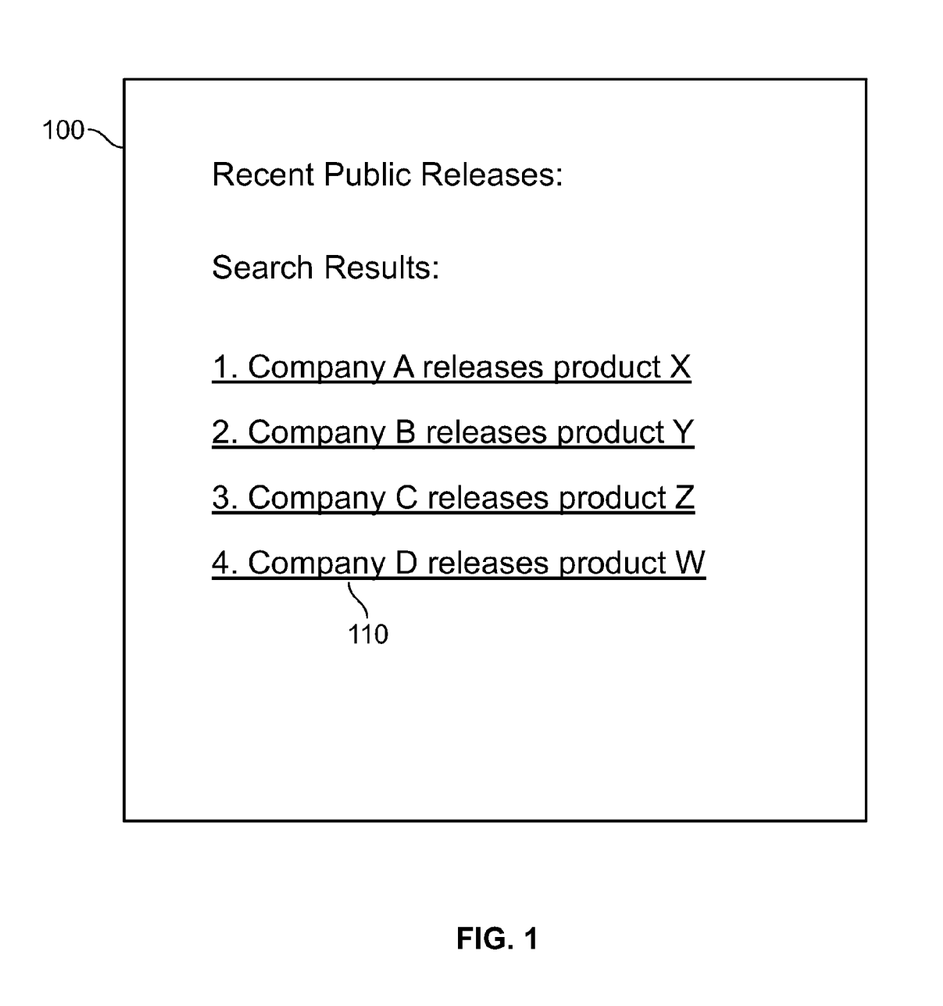
FIG. 1 shows an example of search results shown in a web page.

FIG. 1 shows an example of search results shown in a web page. A web page 100, which can either be under development or already published, includes a search for recent press releases announcing or reporting the public release of products. In this example, a simple list 110 of the recent public releases is shown in the web page, each search result being included as a hypertext link to the corresponding press release (or other content), the heading (e.g., title or headline) of which is displayed as text. Unless web page 100 is already published, in some embodiments its source code will not actually include list 110, e.g., as static content. Instead, it will include the search criteria, the output format and the schedule for updating, and the list 110 is displayed in the web page 100 as shown in a user interface for creating and/or reviewing (e.g., for approval) the web page 100.

Figure 2:
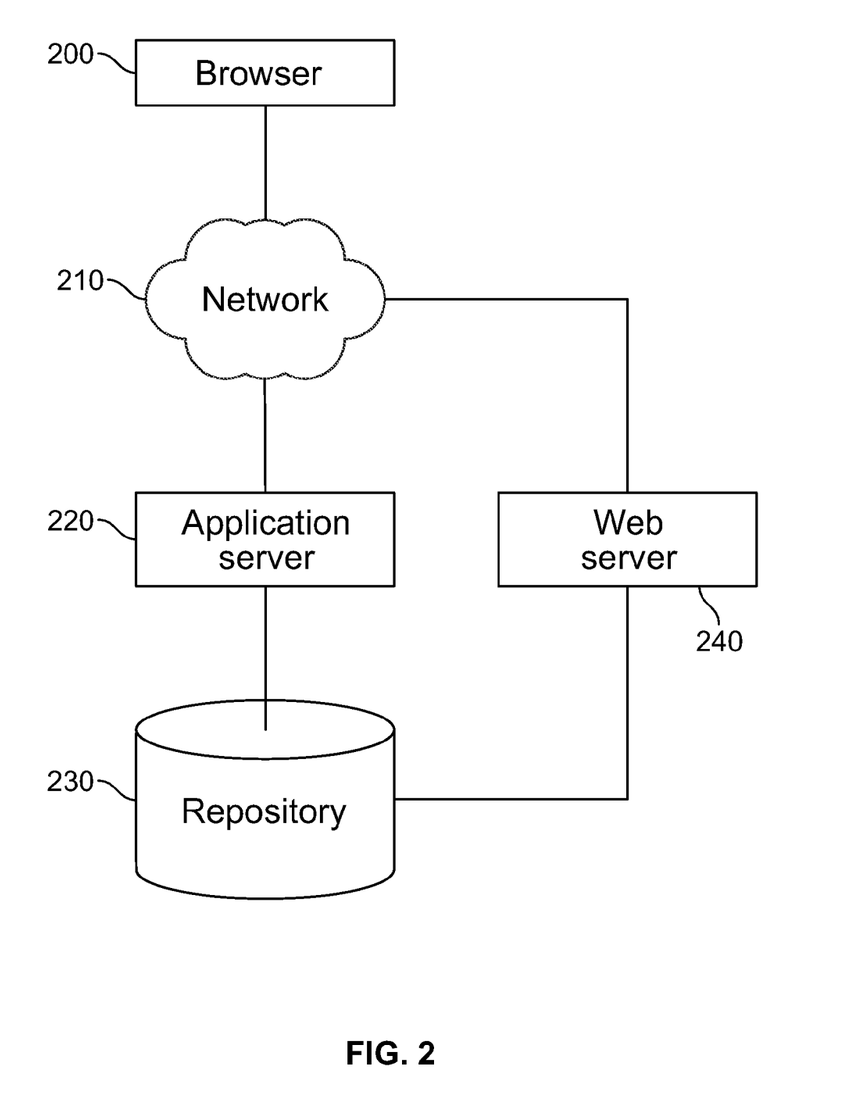
FIG. 2 shows an example of a repository in one embodiment of an enterprise environment.

FIG. 2 shows an example of a repository in one embodiment of an enterprise environment. Web pages under development are saved in a repository 230. In some embodiments they are saved in an intermediate (e.g., XML) format. In one example, an authorized user runs a web design application from an application server 220 to develop a web page in repository 230. In some embodiments, the application is online and can be run within a browser. In some embodiments, the application is a web application integrated with and running on a platform with which repository 230 is associated. Once the page is completed and approved, an HTML version is generated and placed on a web server 240, resulting in its being "published", i.e., made accessible to web browsers. Now a browser 200 is able to access the published page through a network 210.

Figure 3:
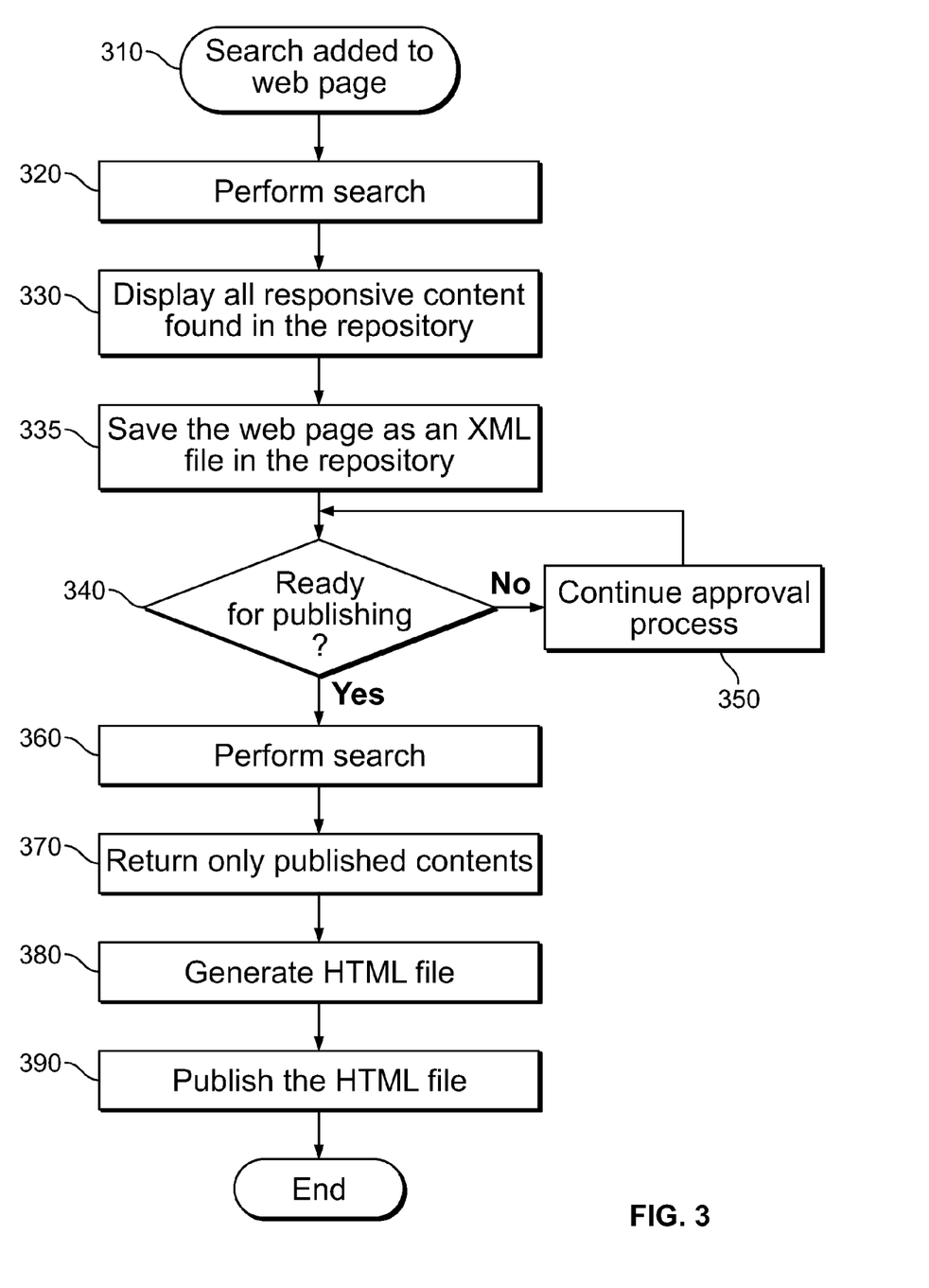
FIG. 3 is a flowchart illustrating a process used in one embodiment to publish a web page in a repository that contains search contents.

FIG. 3 is a flowchart illustrating a process used in one embodiment to publish a web page that includes search result-based content. When the web page is being designed, a search is added to the web page by a web developer (310). In some embodiments, the search is added by defining a search criteria, source(s) to be search, manner in which results are to be displayed, number of results to be displayed, and/or a schedule for updating the content by performing the search and updating the result-based content, if any change is required. A search for content items responsive to the search, for example of one or more internal and/or external repositories, is performed (320). All returned content items, published or unpublished, are displayed to the developer on his design interface (330). In some embodiments, a rendering environment is used to show the search result-based content as it would appear on the web page if published. The design interface in some embodiments enables the user to define "tool tip" or other content to be displayed upon mouse over or other selection of the search results-based content, in the page as published, etc. Once the web page is saved in the XML format in the repository (335) and it is determined that the page is ready to be published (340), a new iteration of the search is performed (360). This time, only published content items are returned and/or included in the web page (370). The search results-based content is formatted and imbedded into an HTML file generated based on the XML file (380). In some embodiments, at publication a hypertext link to a search result-based content item is associated, if applicable, with a URL at which the content item is published, whereas during design and review each content item is associated with a URL or other identifier associated with the content item as stored in the repository, such selection of a link during design or review results in a content item being retrieved from the repository whereas selection of a link in a page as published results in the content being retrieved from a location at which the content is published, if applicable. The HTML file comprising the web page is the final product that will be published to a web server (390).

Figure 4:
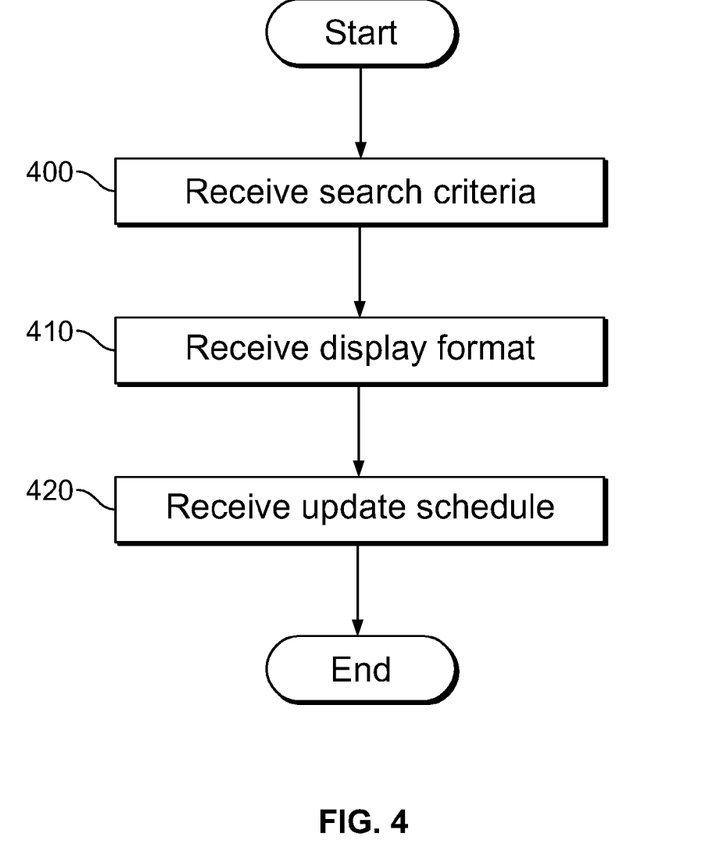
FIG. 4 is a flowchart illustrating a process used in one embodiment to include a search in a web page.

FIG. 4 is a flowchart illustrating a process used in one embodiment to include a search in a web page. Once there is an indication from a user that a search is to be added to a web page, e.g. through a menu item or a widget, the user is asked to enter the search criteria. Search criteria are received (400). The display format for the search results-based content is received (410). A schedule to update and republish (optionally, in some embodiments) is received (420). In some embodiments, step 410 is optional because there is a default display format. In some embodiments, all these steps are performed through a graphical user interface.

Figure 5A:
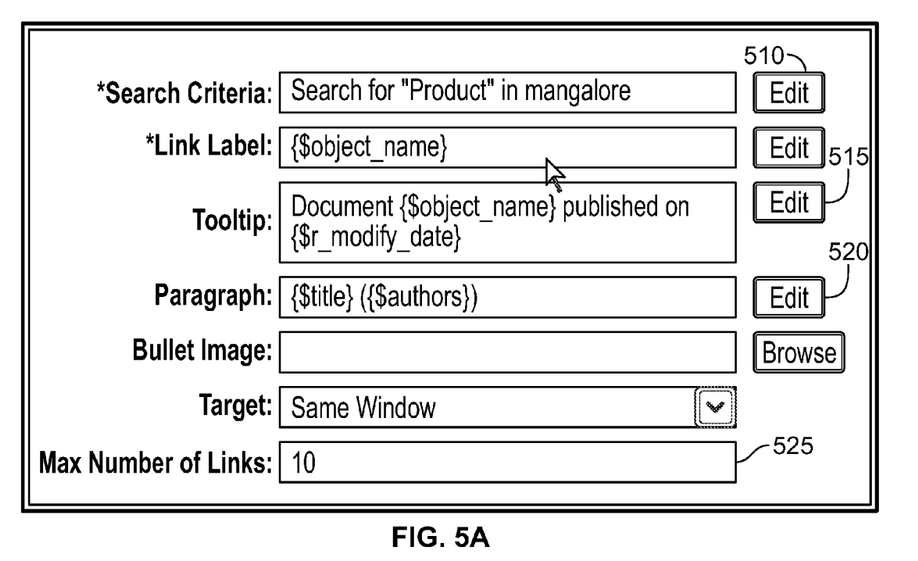
FIG. 5A shows an example of a graphic user interface for including a search in a web page.

FIG. 5A shows an example of a graphical user interface for including a search in a web page. When clicked, an edit button (510) brings up a dialog box for specifying the search criteria will be opened. The rest of the interface is for specifying the display format of the search results. Edit button (515) is used to edit the tool tip, text that pops up when a cursor is moved over a link returned by the search. Edit button (520) is used to specify how to describe the search links on the web page. The bottom edit box (525) sets the limit for the number of matched links that can be displayed per page. The texts that are enclosed by parenthesis and preceded by dollar signs refer to attributes that are associated with each link in the repository.

Figure 5B:
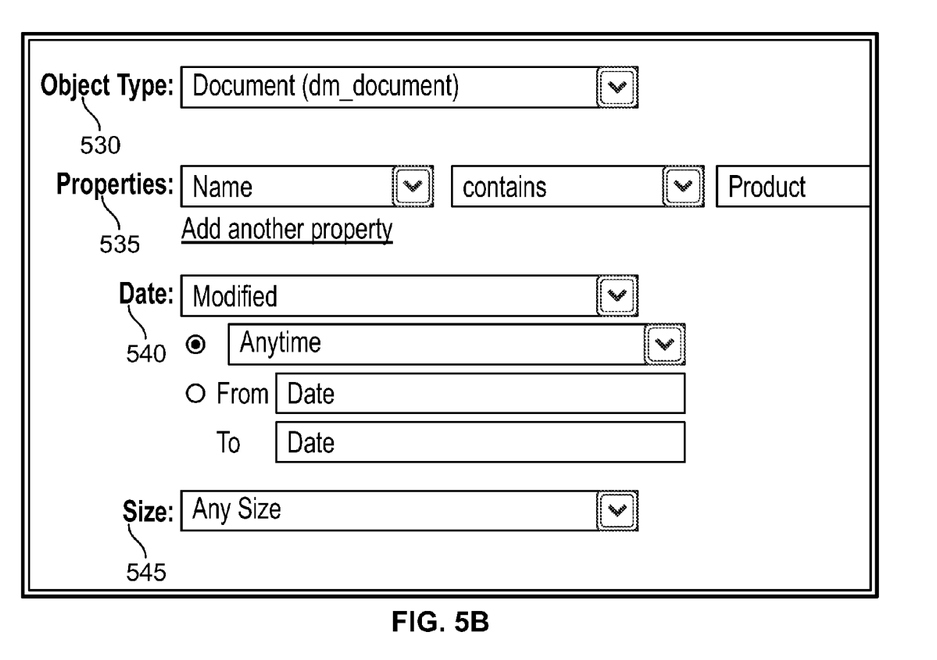
FIG. 5B shows an example of a graphic user interface for specifying search criteria in one embodiment.

FIG. 5B shows an example of a graphic user interface for specifying search criteria in one embodiment. "Object Type" (530) specifies the type of contents to be searched, such as documents, videos, or images. "Properties" (535) are search constraints that are based on the attributes associated with the contents in the repository. For example, to search for German documents, one property can be added such as 'language' 'is' 'German'. "Date" (540) and "Size" (545) can be used to constraint the dates and the sizes of the contents for the search.

Figure 5C:
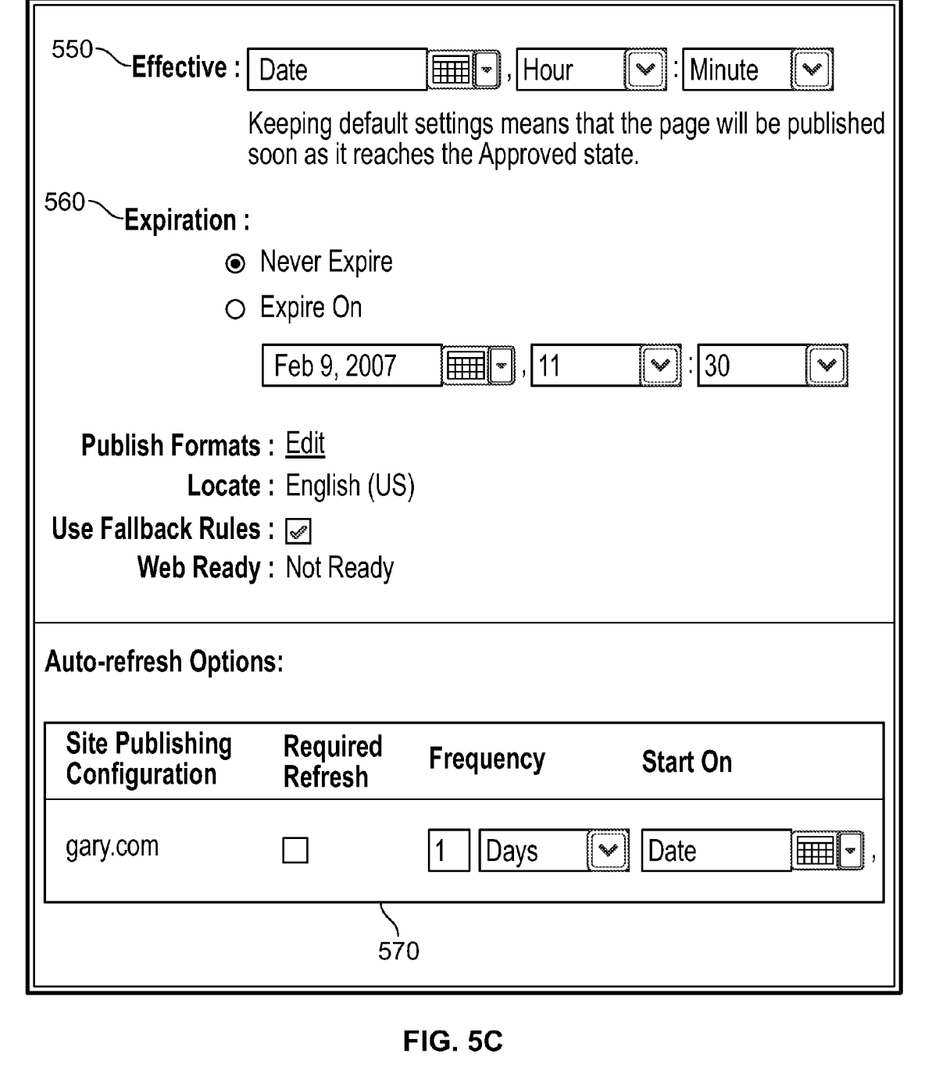
FIG. 5C shows an example of a graphic user interface to stipulate a schedule for publishing a web page with updated search contents in one embodiment.

FIG. 5C shows an example of a graphic user interface to stipulate a schedule for publishing a web page with updated search contents in one embodiment. "Effective" (550) sets the time when the page can be published from the repository. If left as default, the page will be published as soon as it is approved. "Expiration" (560) sets the expiration time for the web page on the web server. "Auto-refresh Options:" (570) stipulates the schedule for the web page to be re-published with updated search contents. For example, when frequency is set as '1' 'Days', the web page will be updated and republished every day.

Figure 6:
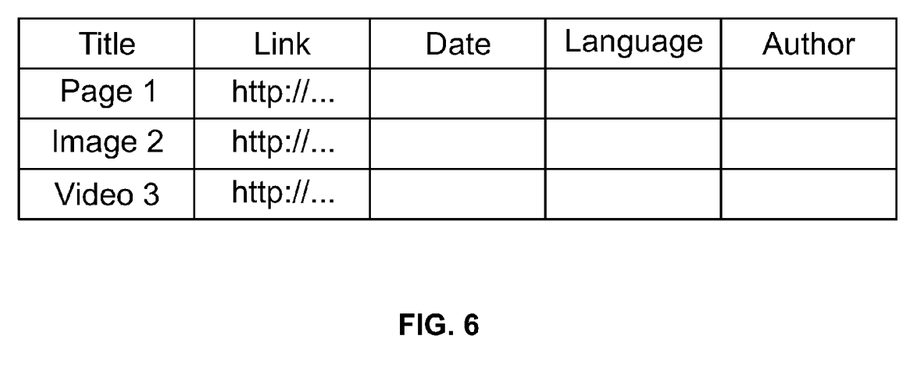
FIG. 6 shows an example of a table used by a repository for associating attributes with links in one embodiment.

FIG. 6 shows an example of a table used by a repository for associating attributes with links in one embodiment. A file in a repository is also associated with a set of attributes on which search criteria can be based. Conceptually, a table is implemented in the repository and/or an associated database or other metadata store, wherein each row is a specific file (or other object) and each column is an attribute. The columns can be easily searched to find files with qualified attributes.

Figure 7:
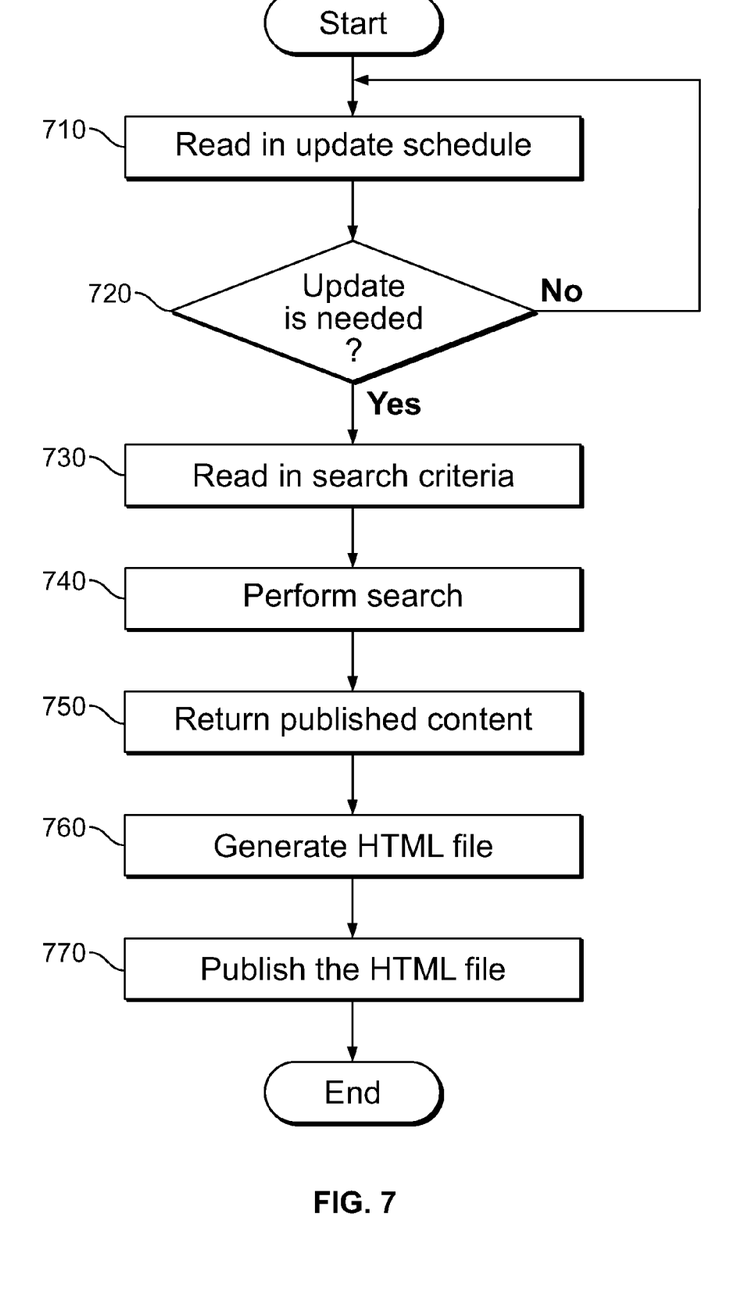
FIG. 7 is a flowchart illustrating an embodiment of a process to repeatedly publish a web page with up-to-date search contents in a repository.

FIG. 7 is a flowchart illustrating an embodiment of a process to update and republish a web page with up-to-date search result-based content. The update schedule associated with the page as saved in the repository is read (710) to determine if an update is needed (720). If so, the search criteria saved in the repository copy of the web page is read (730) and a search is performed (740). In the example shown, because the web page has been published only published content items responsive to the search are returned (750). In some embodiments, all results are returned but non-published items are filtered out. The page is republished with the search results-based content being updated based on the new search results (760 and 770). In some embodiments, the page is only republished if the results of the new or updated search are different than a previous iteration of the search.

Figure 8:
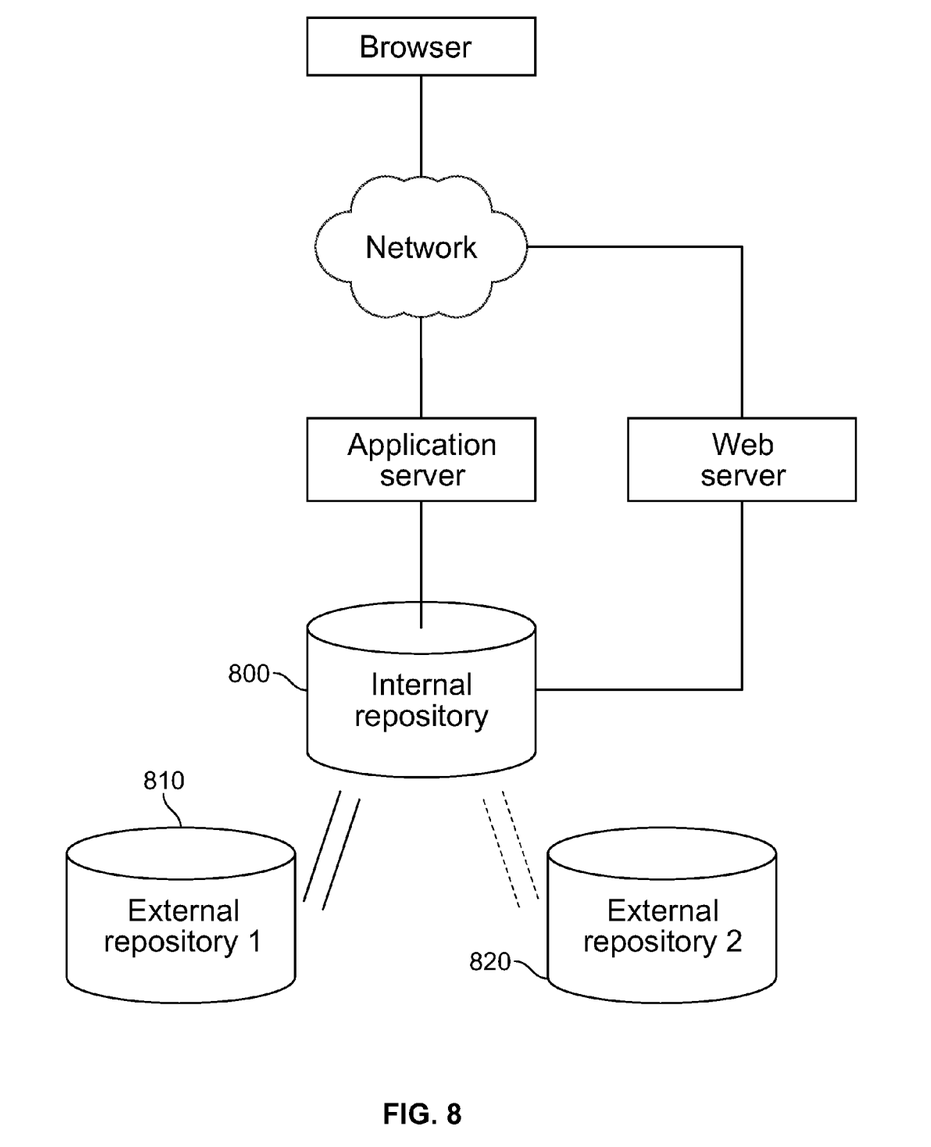
FIG. 8 shows an example of interfaces between an internal repository and external repositories in one embodiment of an enterprise environment.

FIG. 8 shows an example of interfaces between an internal repository and external repositories in one embodiment of an enterprise environment. An internal repository 800 is connected with two external repositories 810 and 820 through different interfaces. Nevertheless, all three repositories can be searched using one search criteria because the application server and the web server only need to access repository 800 for contents in all three repositories Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of including search result based content in a web page, comprising:
receiving one or more search criteria and an indication that a search result based content associated with the search criteria is to be included in a web page; and
using a processor to generate automatically for the web page a computer script or code configured to enable the search result based content to be retrieved in accordance with the search criteria;
wherein the search result based content includes content from pages that:
1) satisfy the search criteria,
2) are associated with a natural language with which the web page is associated, and
3) match a life cycle state of the web page, wherein the life cycle state describes a stage in a content management system approval process;
wherein the natural language comprises a primary natural language associated with the web page;
wherein using the processor to generate automatically includes inserting in the search result based content a specific content from a specific page that satisfies:
1) the search criteria and
2) is associated with a secondary or default natural language associated with the web page,
in the event a corresponding page associated with the primary natural language is not found.

2. A method as recited in claim 1, wherein the indication comprises an indication that the web page is to be published.

3. A method as recited in claim 1, wherein the indication comprises an update indication that a time or the end of an update interval specified by the schedule associated with the web page has arrived.

4. A method as recited in claim 1, wherein receiving a schedule for updating the search result based content is via a graphical user interface.

5. A method as recited in claim 1, further comprising displaying in a web page design interface during design of the web page a current version of the search result based content determined by using the search criteria to perform a search.

6. A method as recited in claim 1, further comprising saving the web page in an intermediate format.

7. A method as recited in claim 6, wherein the intermediate format comprises XML.

8. A method as recited in claim 6, further comprising using the web page in the intermediate format to publish the web page in an HTML format.

9. A method as recited in claim 1, wherein the computer script or code is configured to search or be used to search a repository.

10. A method as recited in claim 9, wherein each of one or more content items stored in the repository has associated with it one or more attributes and the attributes of the respective content items are used to search the repository for content items that satisfy the search criteria.

11. A method as recited in claim 1, wherein in the web page as published the search result based content includes only content that has been published.

12. A method as recited in claim 1, wherein prior to publication of the web page the search result based content includes both published and unpublished content, if any, that satisfies the search criteria.

13. A method as recited in claim 12, further comprising regenerating the search result based content, if necessary, upon publication of the web page such that in the web page as published the search result based content includes only content that has been published.

14. A method as recited in claim 1, wherein one or more external content repositories are searched to generate the search result based content.

15. A method as recited in claim 1, wherein the search result based content is updated every time the web page is read.

16. A method as recited in claim 1, wherein the search result based content is updated periodically.

17. A method as recited in claim 1, further comprising receiving a schedule for updating the search result based content.

18. A method as recited in claim 1, further comprising using the computer script or code to perform a search and receiving the set of search results of the search.

19. A computer system, comprising:
a processor configured to
receive one or more search criteria and an indication that a search result based content associated with the search criteria is to be included in a web page; and
generate automatically for the web page a computer script or code configured to enable the search result based content to be retrieved in accordance with the search criteria;

wherein the search result based content includes content from pages that:
1) satisfy the search criteria,
2) are associated with a natural language with which the web page is associated, and
3) match a life cycle state of the web page, wherein the life cycle state describes a stage in a content management system approval process;

wherein the natural language comprises a primary natural language associated with the web page;

wherein to generate automatically includes inserting in the search result based content a specific content from a specific page that satisfies:
1) the search criteria and
2) is associated with a secondary or default natural language associated with the web page, in the event a corresponding page associated with the primary natural language is not found; and a storage configured to store one or more of the search criteria and the computer script or code.

20. A computer system as recited in claim 19, wherein the indication comprises an update indication that a time or the end of an update interval specified by the schedule associated with the web page has arrived.

21. A computer system as recited in claim 19, wherein the processor is further configured to display in a web page design interface during design of the web page a current version of the search result based content determined by using the search criteria to perform a search.

22. A computer program product for keeping search contents on a webpage up-to-date, the computer program product being embodied in a computer readable medium and comprising computer instructions for:

receiving one or more search criteria and an indication that a search result based content associated with the search criteria is to be included in a web page; and generating automatically for the web page a computer script or code configured to enable the search result based content to be retrieved in accordance with the search criteria;

wherein the search result based content includes content from pages that:
1) satisfy the search criteria,
2) are associated with a natural language with which the web page is associated, and
3) match a life cycle state of the web page, wherein the life cycle state describes a stage in a content management system approval process;

wherein the natural language comprises a primary natural language associated with the web page;

wherein generating automatically includes inserting in the search result based content a specific content from a specific page that satisfies:
1) the search criteria and
2) is associated with a secondary or default natural language associated with the web page, in the event a corresponding page associated with the primary natural language is not found.

23. A computer program product as recited in claim 22, wherein the indication comprises an update indication that a time or the end of an update interval specified by the schedule associated with the web page has arrived.

24. A computer program product as recited in claim 22, further comprising computer instructions for displaying in a web page design interface during design of the web page a current version of the search result based content determined by using the search criteria to perform a search.

* * * * *